United States Patent
Huang

(10) Patent No.: US 9,896,107 B1
(45) Date of Patent: Feb. 20, 2018

(54) DIGITAL LANE CHANGE CONFIRMATION PROJECTION SYSTEMS AND METHODS

(71) Applicant: Denso International America, Inc., Southfield, MI (US)

(72) Inventor: Minglei Huang, Farmington, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/281,423

(22) Filed: Sep. 30, 2016

(51) Int. Cl.
| B60W 30/18 | (2012.01) |
| G08G 1/16 | (2006.01) |
| G05D 1/02 | (2006.01) |
| G05D 1/00 | (2006.01) |
| B60W 50/14 | (2012.01) |
| B60W 10/20 | (2006.01) |
| B60W 10/04 | (2006.01) |
| B60W 10/184 | (2012.01) |

(52) U.S. Cl.
CPC ...... B60W 30/18163 (2013.01); B60W 10/04 (2013.01); B60W 10/184 (2013.01); B60W 10/20 (2013.01); B60W 50/14 (2013.01); G05D 1/0088 (2013.01); G05D 1/0246 (2013.01); G08G 1/167 (2013.01); *B60W 2420/42* (2013.01); *B60W 2420/52* (2013.01); *B60W 2710/00* (2013.01)

(58) Field of Classification Search
USPC .................................................... 701/23–28
See application file for complete search history.

(56) References Cited

U.S. PATENT DOCUMENTS

| 7,630,829 | B2 * | 12/2009 | Pepitone | G01C 23/005 244/75.1 |
| 7,782,184 | B2 * | 8/2010 | Wittorf | B60Q 1/50 340/435 |
| 8,733,939 | B2 * | 5/2014 | Othmer | B60Q 1/50 353/13 |
| 9,481,287 | B2 * | 11/2016 | Marti | B60Q 1/00 |
| 2005/0117364 | A1 * | 6/2005 | Rennick | B60R 1/1207 362/540 |
| 2007/0053195 | A1 * | 3/2007 | Alberti | B60Q 1/2665 362/494 |
| 2007/0067093 | A1 * | 3/2007 | Pepitone | G01C 23/005 701/120 |
| 2010/0017111 | A1 * | 1/2010 | Stefani | B60Q 1/50 701/533 |
| 2011/0301813 | A1 | 12/2011 | Sun et al. | |

(Continued)

FOREIGN PATENT DOCUMENTS

JP         2014134897 A        7/2014

*Primary Examiner* — Tyler J Lee
(74) *Attorney, Agent, or Firm* — Harness, Dickey & Pierce, P.L.C.

(57) ABSTRACT

A system and method are provided and include a light source projector mounted on a subject vehicle, a controller that controls the light source projector to project a bounding box on a roadway upon which the subject vehicle is traveling in a destination lane of a lane change of the subject vehicle; and a sensor that detects a response image projected by a secondary vehicle on the roadway in the adjacent lane, the response image indicating either agreement or disagreement with the lane change of the subject vehicle. The controller generates an alert in the subject vehicle based on the detected response.

22 Claims, 3 Drawing Sheets

(56) References Cited

U.S. PATENT DOCUMENTS

| | | | |
|---|---|---|---|
| 2012/0044090 A1* | 2/2012 | Kahler | B60Q 1/50 340/905 |
| 2014/0204201 A1* | 7/2014 | Norman | B60K 35/00 348/113 |
| 2015/0154802 A1* | 6/2015 | Song | G08B 5/00 345/633 |
| 2015/0203023 A1 | 7/2015 | Marti et al. | |
| 2015/0287324 A1* | 10/2015 | Schwindt | B60W 50/14 340/435 |
| 2017/0024617 A1* | 1/2017 | Yamaguchi | G01C 21/28 |
| 2017/0131401 A1* | 5/2017 | Pascheka | G01S 13/931 |

\* cited by examiner

DIGITAL LANE CHANGE CONFIRMATION PROJECTION SYSTEMS AND METHODS

FIELD

The present disclosure relates to systems and methods for lane change confirmation projection and, in particular, to systems and methods that project laser lines and graphics onto a road surface for projecting a bounding box from a subject vehicle onto an adjacent lane prior to the subject vehicle changing lanes.

BACKGROUND

This section provides background information related to the present disclosure, which is not necessarily prior art.

Turn signals are generally used by vehicles prior to changing lanes to indicate to surrounding drivers that the vehicle intends to change lanes. Such systems, however, provide no visual indication of the lane destination of the vehicle. Such systems also provide no feedback from surrounding vehicles as to whether the drivers of such vehicles agree or disagree with the subject vehicles lane change. As such, traditional systems are subject to improvement.

SUMMARY

This section provides a general summary of the disclosure, and is not a comprehensive disclosure of its full scope or all of its features.

The present teachings include a system comprising at least one light source projector mounted on a subject vehicle, a controller that controls the at least one light source projector to project a bounding box on a roadway upon which the subject vehicle is traveling in a destination lane of a lane change of the subject vehicle, and a sensor that detects a response image projected by a secondary vehicle on the roadway in the adjacent lane, the response image indicating either agreement or disagreement with the lane change of the subject vehicle. The controller generates an alert in the subject vehicle based on the detected response.

The present teachings also include a method comprising controlling, with a controller, at least one light source projector mounted on a subject vehicle to project a bounding box on a roadway upon which the subject vehicle is traveling in a destination lane of a lane change of the subject vehicle. The method also includes detecting, with a sensor, a response image projected by a secondary vehicle on the roadway in the adjacent lane, the response image indicating either agreement or disagreement with the lane change of the subject vehicle. The method also includes generating, with the controller, an alert in the subject vehicle based on the detected response.

The present teachings also include another system comprising at least one light source projector mounted on an autonomous vehicle, a controller that controls the at least one light source projector to project a bounding box on a roadway upon which the autonomous vehicle is traveling in a destination lane of a lane change of the autonomous vehicle, and a sensor that detects a response image projected by a secondary vehicle on the roadway in the adjacent lane, the response image indicating either agreement or disagreement with the lane change of the subject vehicle. The controller controls the autonomous vehicle to change lanes into the destination lane in response to the response image indicating agreement.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
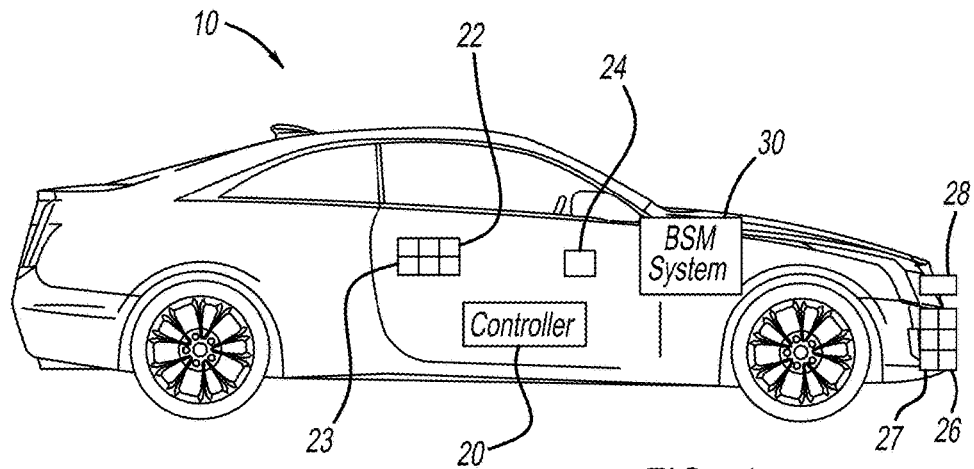
FIG. 1 illustrates a subject vehicle with a laser line and graphics projection system according to the present disclosure.

With reference to FIG. 1, a vehicle 10 having a laser line and graphics projection system is illustrated. Although the vehicle 10 is illustrated as an automobile, the present teachings apply to any other suitable vehicle, such as a passenger car, sport utility vehicle (SUV), a mass transit vehicle (such as a bus), a semi-trailer truck, and/or a military vehicle, as examples.

In the example of FIG. 1, the vehicle 10 includes a controller 20 and a bank of light source projectors 22 on a side portion of the vehicle, with each light source projector 22 having a corresponding positional actuator 23. Similarly, the vehicle 10 also includes a bank of light source projectors 26 on a front portion of the vehicle, with each light source projector 26 having a corresponding positional actuator 27. Additionally or alternatively, light source projectors can be positioned at other locations on the vehicle 10. In particular, while the bank of light source projectors 26 are shown on a right side of the vehicle 10, a similar bank of light source projectors 26 may be positioned on the left side of the vehicle. The controller 20 can control the positional actuators 23, 27 to project laser lines and graphics onto the roadway beside and/or in front of the vehicle 10, as discussed below.

The light source projectors 22, 26 can include suitable light sources, such as a laser diode emitting a laser beam of visible light. Additionally or alternatively, the light source projectors 22, 26 can include other light emitting diodes (LEDs), or other light sources, suitable and configured to produce a suitable beam of light that can be focused and directionally projected.

The positional actuators 23, 27 can adjust a directional position of the corresponding light source projectors 22, 26 to project laser lines and graphics onto a roadway beside and/or in front of the vehicle 10. For example, the bank of light source projectors 22 on the side portion of the vehicle 10 can be positioned and controlled by the controller 20 to project laser lines and graphics onto an area of the roadway beside the vehicle 10. Additionally, the bank of light source projectors 26 on the front of the vehicle 10 can be positioned and controlled by the controller 20 to project laser lines and graphics onto an area of the roadway in front of the vehicle 10. For example, one or more of the light sources in the bank of light source projectors 22, 26 can be rapidly positioned by the corresponding positional actuator to rapidly trace an outline of a laser line and/or graphic on the roadway beside or in front of the vehicle 10. In this way, the controller 20 can control the positional actuators 23, 27 such that the light source projectors 22, 26 project laser lines and graphics onto the roadway beside and/or behind the vehicle 10. The term laser lines, as used in the context of the laser lines projected by the light source projectors 22, 26 onto the roadway, refer to a clearly defined and distinct line of light projected onto the roadway as a line or as part of a graphic.

The vehicle 10 also includes a side image sensor 24, such as a camera, that detects images of a surrounding area to the side of the vehicle 10. The vehicle 10 also includes a front image sensor 28, such as a camera, that detects images of a surrounding area in front of the vehicle 10.

As shown in FIG. 1, the vehicle 10 can also include a blind spot monitoring system 30 that detects vehicles in a blind spot of the vehicle 10.

Figure 2A:
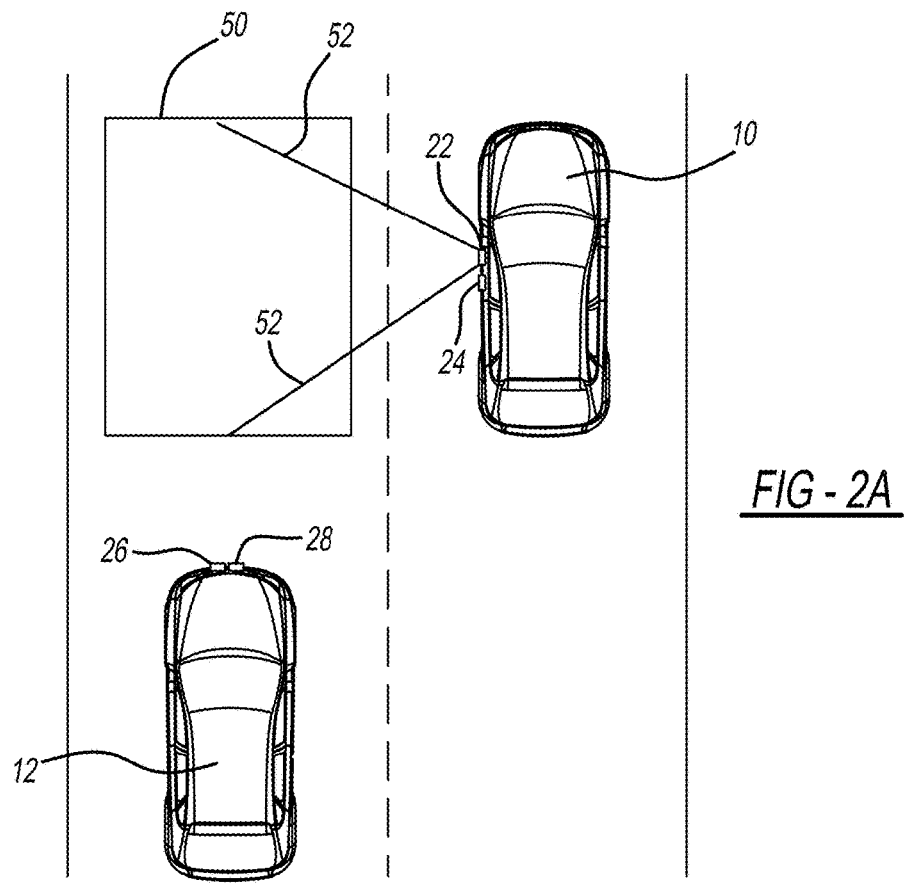
FIGS. 2A and 2B illustrate the subject vehicle and a secondary vehicle, each with a laser line and graphics projection system according to the present disclosure.
Figure 2B:
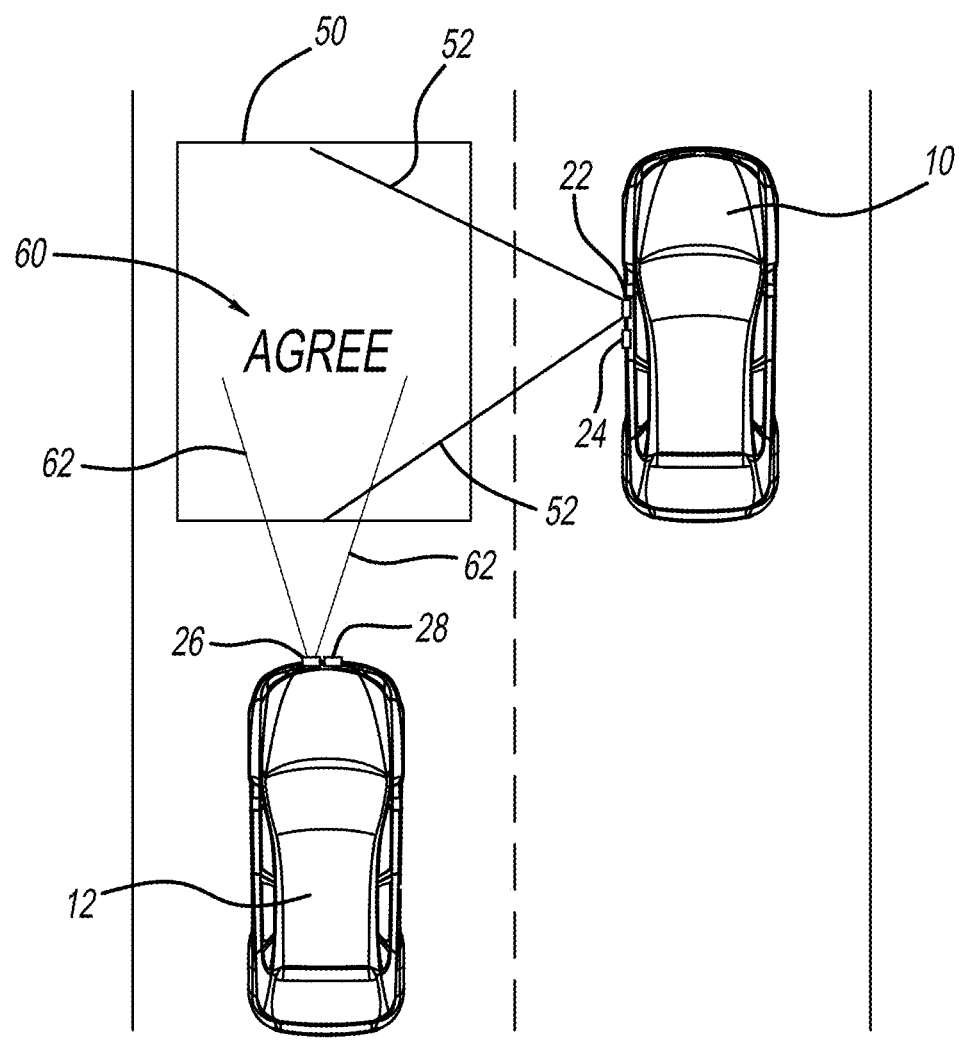

With reference to FIGS. 2A and 2B, when a driver of the vehicle 10 intends to change lanes, the driver may activates laser line and graphics projection system to project a bounding box 50 comprised of laser lines projected onto the destination lane. The bounding box 50 is approximately the size of the vehicle 10. As shown in FIG. 2A, the bank of light source projectors 22 project laser beams 52 to project the bounding box 50 comprised of laser lines projected onto the destination lane. For example, the vehicle 10 may include a switch to activate the laser line and graphics projection system to project the bounding box 50 to either the left side or the right side of the vehicle. The vehicle 10 may include a separate switch or switches for the laser line and graphics projection system. Alternatively, the laser line and graphics projection system may be activated based on activation of the left or right turn signals of the vehicle.

Alternatively, the laser line and graphics projection system may be installed in a self-driving or autonomous vehicle, wherein the controller 20 of the vehicle 10 may control other vehicle systems, such as a steering system, a braking system, and a throttle system, to drive the self-driving or autonomous vehicle. In such case, the laser line and graphics projection system may be activated by the controller 20 prior to the self-driving or autonomous vehicle making a lane change.

As shown in FIGS. 2A and 2B, a secondary vehicle 12 is located in the destination lane of the vehicle 10. A driver of the secondary vehicle 12 may observe the bounding box 50 projected onto the roadway in front of the secondary vehicle 12. The driver of the secondary vehicle 12 may then determine that there is enough space for the vehicle 10 to change lanes in front of the secondary vehicle 12. In such case, the driver of the secondary vehicle 12 may activate the laser line and graphics projection system of the secondary vehicle 12 to project a message onto the roadway indicating to the driver of the vehicle 10 that the driver of the secondary vehicle 12 agrees with the lane change of the vehicle 10. As shown in FIG. 2B, the light source projectors 26 project a graphic 60 indicating "AGREE" onto the roadway with laser beams 62 emitted from the light source projectors 26. While the graphic 60 shown in FIG. 2B indicates "AGREE," other graphics may be used, such as "OK" or a symbol. Also, the light source projectors 26 may simply project a green symbol to indicate that the driver of the secondary vehicle 12 agrees with the lane change of the vehicle 10 or a red symbol to indicate that the driver of the secondary vehicle 12 does not agree with the lane change of the vehicle 10.

Additionally or alternatively, the image sensor 28 of the secondary vehicle 12 may detect an image in front of the secondary vehicle 12 that includes the bounding box 50 projected onto the roadway in front of the secondary vehicle 12. In such case, a controller 20 of the secondary vehicle 12 may detect the bounding box 50 within the detected image and may prompt the driver of the secondary vehicle 12 to indicate either agreement or disagreement with the proposed lane change of the subject vehicle 10. For example, the controller 20 of the secondary vehicle 12 may generate a visual, audio, or haptic alert prompting the driver of the secondary vehicle 12 to control the laser line and graphics projection system of the secondary vehicle 12 to generate output indicating either agreement or disagreement with the lane change of the subject vehicle 10.

Once the laser line and graphics projection system of the secondary vehicle 12 generates the graphic 60 indicating agreement or disagreement with the lane change, a driver of the vehicle 10 may observe the graphic 60 and proceed with the lane change if the graphic 60 indicates agreement or continue traveling in the current lane if the graphic 60 indicates disagreement. Additionally or alternatively, a side image sensor 24 of the vehicle may detect the graphic 60 and the controller 20 of the vehicle 10 may recognize the graphic 60 within the detected image and may generate a visual, audio, or haptic alert to the driver of the vehicle 10 indicating whether the graphic is indicating agreement or disagreement with the lane change. Alternatively, in the case of a self-driving or autonomous vehicle, once the controller 20 of the vehicle 10 detects the graphic indicating agreement within the detected image, the controller 20 may control the vehicle 10 to proceed with the lane change or, if the graphic indicates disagreement, prevent the vehicle 10 from changing lanes.

Figure 3:
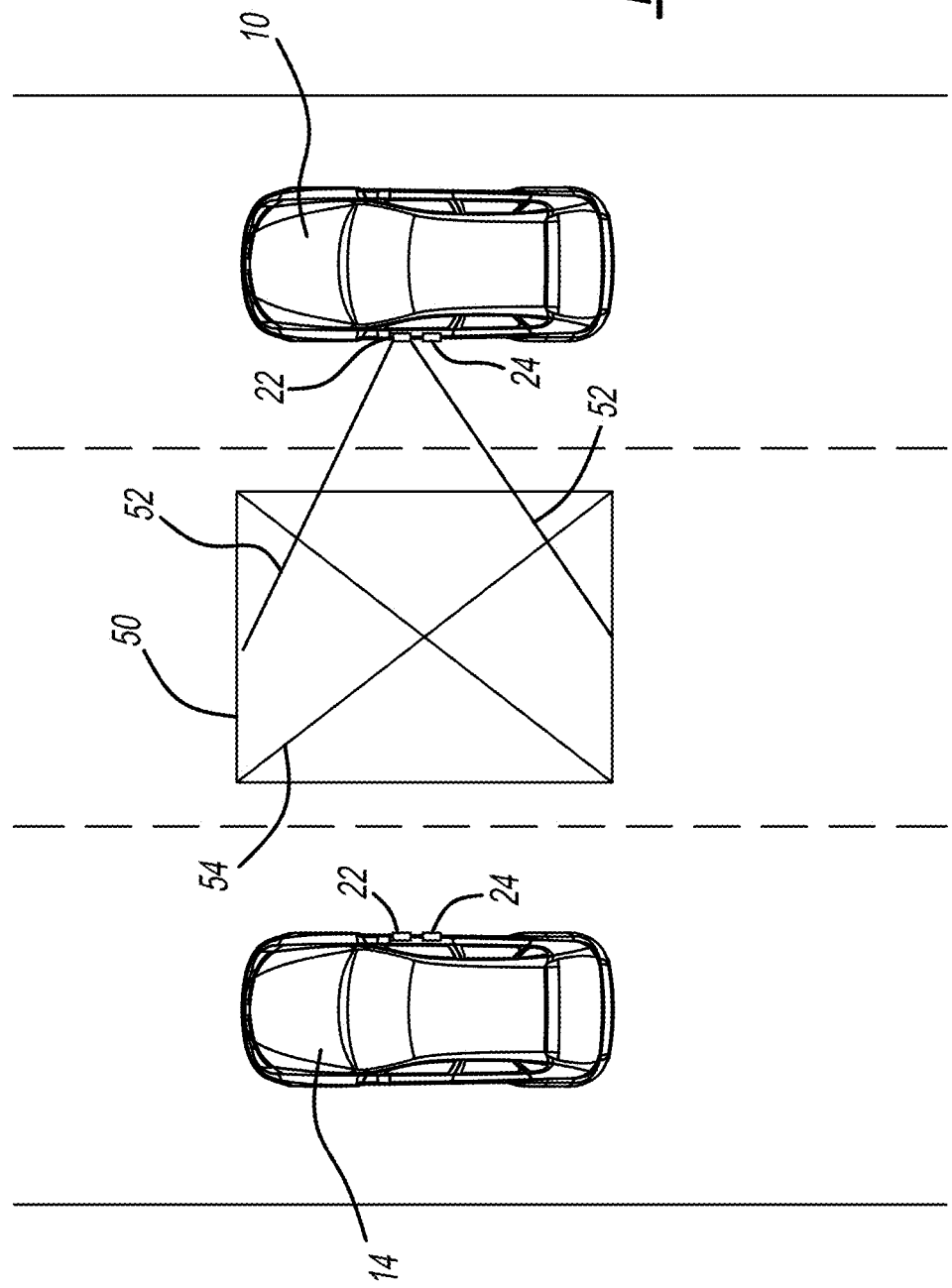
FIG. 3 illustrates the subject vehicle with another secondary vehicle, each with a laser line and graphics projection system according to the present disclosure.

With reference to FIG. 3, in addition to the bounding box 50, the light source projectors 22 may project a graphic 54 with an "X" within the bounding box 50 to indicate to surrounding vehicles that the surrounding vehicles should not move into the bounding box 50. For example, if a secondary vehicle 14 is detected two lanes over from the vehicle 10, and the driver of the vehicle 10 desires to change lanes into the lane between the vehicle and the secondary vehicle 14, the laser line and graphics projection system can project the bounding box 50 with the graphic 54 with the "X" within the bounding box 50.

Additionally, a side image sensor 24 of the secondary vehicle 14 may detect the graphic 54 with the "X" within the bounding box 50. In such case, a controller 20 of the secondary vehicle 14 may detect the graphic 54 within the detected image and may prohibit the secondary vehicle 14 from projecting another bounding box into the same lane of the roadway. Additionally or alternatively, the controller 20 of the secondary vehicle 14 may notify the driver of the secondary vehicle 14 that changing lanes into the lane with the bounding box 50 is prohibited. In the case of a self-driving or autonomous vehicle, the controller 20 may prohibit the self-driving or autonomous vehicle from changing lanes into the lane with the bounding box 50.

In the event that a secondary vehicle is not equipped with the a laser line and graphics projection system, the controller 20 of the vehicle 10 may control the laser line and graphics projection system of the vehicle 10 to project the bounding box 50 for a predetermined period of time, such as, for example, one minute, two minutes, or another suitable time period. The controller 20 may monitor images detected by the side image sensor 24 to determine whether a secondary vehicle has entered or is approaching the bounding box within the predetermined time. Alternatively, the controller 20 may monitor output from the BSM system 30 to determine whether a secondary vehicle has entered or is approaching the bounding box 50. Alternatively, a radar sensor, a lidar sensor, and/or an ultrasonic sensor may be used to determine whether a secondary vehicle is approaching the bounding box 50. When the controller 20 determines that a secondary vehicle has not entered or approached the bounding box 50 within the predetermined time period, the controller 20 may notify the driver of the vehicle 10 to proceed with the lane change. Alternatively, in the case of a self-driving or autonomous vehicle, the controller 20 may control the vehicle 10 to proceed with the lane change.

Further, in the event that the controller 20 determines that there are no secondary vehicles in the vicinity of the vehicle 10, the controller may determine that the laser line and graphics projection system does not need to be activated to project the bounding box. For example, the controller 20 may monitor output from the image sensor(s) 24, from the BSM system 30, and/or from other vehicle sensors, such as radar, lidar, ultrasonic sensors, and/or other environmental sensors, and may determine that there are no secondary vehicles within the vicinity of the vehicle 10 or within a predetermined distance of the vehicle 10. In such case, the controller 20 may notify the driver to proceed with the lane change without projecting the bounding box 50. In the case of a self-driving or autonomous vehicle, the controller 20 may control the vehicle 10 to proceed with the lane change without projecting the bounding box 50.

In this application, including the definitions below, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   at least one light source projector mounted on a subject vehicle;
   a controller that controls the at least one light source projector to project a bounding box on a roadway upon which the subject vehicle is traveling in a destination lane of a lane change of the subject vehicle, the bounding box being projected entirely within the destination lane and ahead of a secondary vehicle traveling on the roadway in the destination lane; and
   a sensor that detects a response image projected by the secondary vehicle on the roadway in the destination lane, the response image indicating agreement with the lane change of the subject vehicle;
   wherein the controller generates an alert in the subject vehicle based on the detected response image.

2. The system of claim 1, further comprising at least one additional light source projector mounted on the subject vehicle, wherein the controller controls the at least one light source projector to project a response image projected by the subject vehicle, the response image indicating either agreement or disagreement with a lane change of another vehicle.

3. The system of claim 1, further comprising at least one positional actuator associated with each light source projector of the at least one light source projector, wherein the controller controls the at least one light source projector to project the bounding box on the roadway by controlling the at least one positional actuator associated with each light source projector.

4. The system of claim 1, wherein the sensor includes an image sensor.

5. The system of claim 1, further comprising at least one additional sensor that detects a position of other vehicles traveling on the roadway, wherein the controller detects whether another vehicle traveling on the roadway has entered the bounding box within a predetermined time period after initiating projection of the bounding box and generates another alert in the subject vehicle based on whether another vehicle traveling on the roadway has entered the bounding box.

6. The system of claim 5, wherein the at least one additional sensor includes at least one of an image sensor, a radar sensor, a lidar sensor, and an ultrasonic sensor.

7. The system of claim 5, wherein the at least one additional sensor is configured to detect a secondary vehicle traveling two lanes over from the subject vehicle and wherein the controller controls the at least one light source projector to project a graphic image within the bounding box in response to detecting the secondary vehicle traveling two lanes over from the subject vehicle.

8. The system of claim 1, wherein the sensor detects an additional response image projected by the secondary vehicle on the roadway in the destination lane, the additional response image indicating disagreement with the lane change of the subject vehicle.

9. The system of claim 1, wherein the sensor detects the response image projected by the secondary vehicle within the bounding box projected by the subject vehicle.

10. A method comprising:
controlling, with a controller, at least one light source projector mounted on a subject vehicle to project a bounding box on a roadway upon which the subject vehicle is traveling in a destination lane of a lane change of the subject vehicle, the bounding box being projected entirely within the destination lane and ahead of a secondary vehicle traveling on the roadway in the destination lane;
detecting, with a sensor, a response image projected by the secondary vehicle on the roadway in the destination lane, the response image indicating agreement with the lane change of the subject vehicle; and
generating, with the controller, an alert in the subject vehicle based on the detected response image.

11. The method of claim 10, further comprising controlling, with the controller, at least one additional light source projector mounted on the subject vehicle to project a response image projected by the subject vehicle, the response image indicating either agreement or disagreement with a lane change of another vehicle.

12. The method of claim 10, further comprising controlling, with the controller, at least one positional actuator associated with each light source projector of the at least one light source projector to project the bounding box on the roadway.

13. The method of claim 10, wherein the sensor includes an image sensor.

14. The method of claim 10, further comprising detecting, with at least one additional sensor that detects a position of other vehicles traveling on the roadway, wherein the controller detects whether another vehicle traveling on the roadway has entered the bounding box within a predetermined time period after initiating projection of the bounding box and generates another alert in the subject vehicle based on whether another vehicle traveling on the roadway has entered the bounding box.

15. The method of claim 14, wherein the at least one additional sensor includes at least one of an image sensor, a radar sensor, a lidar sensor, and an ultrasonic sensor.

16. The method of claim 14, wherein the at least one additional sensor is configured to detect a secondary vehicle traveling two lanes over from the subject vehicle, the method further comprising controlling, with the controller, the at least one light source projector to project a graphic image within the bounding box in response to detecting the secondary vehicle traveling two lanes over from the subject vehicle.

17. A system comprising:
at least one light source projector mounted on an autonomous vehicle;
a controller that controls the at least one light source projector to project a bounding box on a roadway upon which the autonomous vehicle is traveling in a destination lane of a lane change of the autonomous vehicle, the bounding box being projected entirely within the destination lane and ahead of a secondary vehicle traveling on the roadway in the destination lane; and
a sensor that detects a response image projected by the secondary vehicle on the roadway in the destination lane, the response image indicating agreement with the lane change of the autonomous vehicle;
wherein the controller controls the autonomous vehicle to change lanes into the destination lane in response to the response image indicating agreement.

18. The system of claim 17, further comprising at least one additional light source projector mounted on the autonomous vehicle, wherein the controller controls the at least one light source projector to project a response image projected by the autonomous vehicle, the response image indicating either agreement or disagreement with a lane change of another vehicle.

19. The system of claim 17, further comprising at least one positional actuator associated with each light source projector of the at least one light source projector, wherein the controller controls the at least one light source projector to project the bounding box on the roadway by controlling the at least one positional actuator associated with each light source projector.

20. The system of claim 17, wherein the sensor includes an image sensor.

21. The system of claim 17, further comprising at least one additional sensor that detects a position of other vehicles traveling on the roadway, wherein the controller detects whether another vehicle traveling on the roadway has entered the bounding box within a predetermined time period after initiating projection of the bounding box and controls the autonomous vehicle to change lanes into the destination lane in response to determining that another vehicle has not entered the bounding box within the predetermined time period.

22. The system of claim 21, wherein the at least one additional sensor includes at least one of an image sensor, a radar sensor, a lidar sensor, and an ultrasonic sensor.

\* \* \* \* \*